April 29, 1930.   O. A. BARTHOLOMEW   1,756,477
PROCESS OF SEASONING LOGS
Filed March 14, 1929
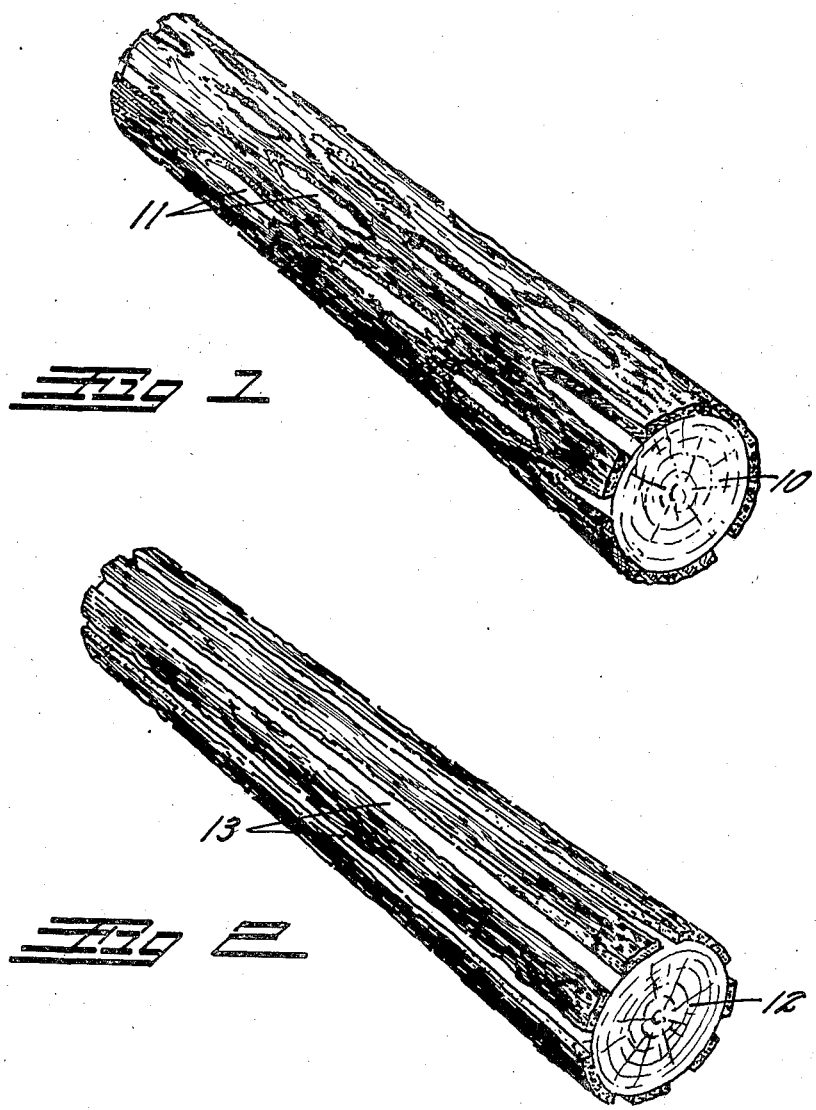

Patented Apr. 29, 1930

1,756,477

UNITED STATES PATENT OFFICE

ORLO A. BARTHOLOMEW, OF KANSAS CITY, MISSOURI

PROCESS OF SEASONING LOGS

Application filed March 14, 1929. Serial No. 346,944.

This invention relates to a method for seasoning logs, more especially to seasoning logs for use as telegraph, telephone, electric poles, piles, etc. If logs are allowed to lie upon the ground with the bark in place they will season very slowly, so slowly in fact that it is not practical to allow the logs to lie until seasoned. Long before the seasoning has penetrated the entire log, rot and stain will take place and the log will be attacked by insects, borers, etc. If the bark is entirely removed from the log it will season rapidly, but will not season uniformly. The drying out process will commence at the periphery of the log and the surface layers will dry out long before the interior. This causes the outer layers to contact more rapidly than the interior and causes deep checks or cracks. These cracks greatly reduce the structural strength of the poles and supply openings for the entrance of moisture, borers, and other destructive insects. The principal object of this invention is to provide a method by means of which the logs can be rapidly and uniformly seasoned throughout their thickness so that cracks and checks will be practically eliminated.

If unseasoned logs are stripped of their bark and treated with creosote or other wood preservative the preserving compound will be unable to penetrate the log to any useful depth because of the moisture filled pores.

Another object of this invention is to provide a method for seasoning the logs which will increase their absorption powers for the wood preservative compounds and will allow the preservative compounds to uniformly penetrate the log at all points.

A further object of the invention is to prevent insects and the like from attacking and destroying the logs or poles while they are seasoning and awaiting the preservative.

Other objects and advantages reside in the method of preparing the logs for seasoning and in the seasoning process itself. These will become more apparent from the following description.

In the following detailed description of the invention reference is had to the accompanying drawing which forms a part hereof.

Like numerals refer to like parts in all views of the drawing and throughout the description.

In the drawing:

Fig. 1 and Fig. 2 illustrate at 10 and 12, typical logs which have been prepared for seasoning according to this invention.

I have found that when the bark is entirely stripped from a log and it is allowed to air-season, invariably deep checks and cracks result. I have also found that it is impractical to allow a log to season with the bark on. The time required is too great to be permissible in commercial production and the damage resulting to the log from rot, insects, weather stains, etc., is too great to allow this procedure.

My invention contemplates removing only a portion of the bark. The removing being done at substantially uniform points throughout the circumference and length of the log. This may be done by removing the bark in patches, as illustrated at 11 in Fig. 1, throughout the length and circumference of the log.

The preferred method, however, is illustrated in Fig. 2, in which the bark is removed or stripped in long, longitudinal spaced apart lines 13 throughout the length of the log. The bark may be removed by any of the usual stripping knives.

The result of this method is to cause the remaining bark to retard the seasoning of the surface wood layers, and allow penetration of the air through the patches or bared spaces toward the heart of the log. The moisture passing outwardly through the bared spaces prevents them from drying out until all of the interior moisture has been removed so that the log literally dries from the inside out. Thus the core of the log contracts first and the surface contracts thereover without imparting a bursting strain to the surface layers.

Theoretically, just sufficient of the bark should be removed to allow a uniform drying of the log from its heart to the surface. In practical operations such perfection is impossible, but if substantially one-fourth to one-half of the bark is removed, at uniform positions, the surface seasoning will be so retarded that checks or seasoning cracks will be practically eliminated.

After the bark has been stripped as indicated in the drawing, it is preferred to place the logs upon elevated drying decks to support them from the ground while seasoning and to spray the logs with any of the usual insect poisons such as Paris green.

A log with all of its bark in place can not be protected against insect attacks because of the fact that an insecticide solution will not penetrate the bark. Wood beetles, borers, and other destructive insects enter the log in the cambium between the bark and the wood proper, and are thereby safely protected from the poisonous solution. By treating a log, prepared as illustrated in the drawing, with a poisonous solution, the solution will enter the cut-away portions and will be absorbed by the cambium and will thereby effectively prevent the entrance of insects during the seasoning period.

After the seasoning has been completed the remaining bark may be removed by any of the usual barking processes or machines such as the one illustrated in the applicant's copending application, Serial No. 346,943.

It has been found that the removal of the remaining bark is greatly facilitated after the use of this seasoning process as the numerous cut-away portions allow the air to enter between the bark and the log and so as to dry and loosen the cambium so that the remaining bark can be quickly broken away.

Poles which have been seasoned by this method have unusual absorption for creosote and other preservatives. This is probably due to the uniform cell structure which has been maintained in the wood by the uniform seasoning thereof.

The method or process has, among others, therefore the following advantages; it prevents deep cracks or checks; it prevents insects attacking the seasoning logs; it gives a greater penetration for creosote or other wood preservative compounds; and it facilitates the final removal of the bark.

While I have described my invention in some detail, together with the theories which I believe to explain its success, it is to be understood that my invention is not limited to the precise procedure described nor is dependent upon the accuracy of the theories which I have advanced. On the contrary, my invention is not to be regarded as limited except in so far as such limitations are included within the terms of the accompanying claims, in which it is my intention to claim all novelty inherent in my invention as broadly as is permissible in view of the prior art.

Having thus described the invention, what I claim and desire secured by Letters Patent is:—

1. A method for preparing logs for seasoning comprising: removing a portion of the bark there from, said bark being removed at substantially uniformly spaced areas about the surface of the log.

2. A method for preparing logs for seasoning comprising: removing a portion of the bark there from, said bark being removed at substantially uniformly spaced areas about the surface of the log; said areas comprising: substantially from one-fourth to one-half the surface area of the log.

3. A method for preparing logs for seasoning comprising: removing a portion of the bark there from, said bark being removed at substantially uniformly spaced areas about the surface of the log; and spraying said logs with an insecticide.

4. A method for preparing logs for seasoning comprising: stripping the bark from said logs, in longitudinal spaced apart strips extending substantially throughout the length of the log.

5. A method for retarding the surface seasoning of logs comprising: allowing a portion of the bark of said log to remain in position and removing the remainder.

6. A method for retarding the suface seasoning of logs comprising: allowing a portion of the bark of said log to remain in position and removing the remainder, said portion of the bark being disposed substantially uniformly over the entire surface of said log.

7. A method of seasoning logs comprising: removing portions of the bark therefrom at approximately equally spaced intervals over the surface of said log; and submitting said log to air drying with the remainder of the bark in position thereon.

In testimony whereof, I affix my signature.

ORLO A. BARTHOLOMEW.